United States Patent
Joseph et al.

[19]

[11] Patent Number: 6,156,436

[45] Date of Patent: *Dec. 5, 2000

[54] USE OF A CRYSTALLINE BEAD BOND LAYER IN A RETROREFLECTIVE ARTICLE

[75] Inventors: William D. Joseph, River Falls, Wis.; Lee A. Pavelka, Cottage Grove; Raymond E. Grunzinger, Scandia, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/832,878

[22] Filed: Apr. 4, 1997

[51] Int. Cl.[7] .......................... B32B 27/30; B32B 27/40; G02B 5/128

[52] U.S. Cl. .................. 428/424.4; 359/540; 359/541; 428/206; 428/207; 428/210; 428/328; 428/331; 428/423.1; 428/424.2; 428/425.5; 428/425.6; 428/425.8

[58] Field of Search ........................ 428/210, 206, 428/207, 328, 331, 423.1, 424.2, 424.4, 425.5, 425.6, 425.8; 359/540, 541

[56] References Cited

U.S. PATENT DOCUMENTS

| | | | |
|---|---|---|---|
| 3,190,178 | 6/1965 | McKenzie | 359/514 |
| 4,025,159 | 5/1977 | McGrath | 359/514 |
| 4,530,859 | 7/1985 | Grunzinger, Jr. | 427/385.5 |
| 4,533,592 | 8/1985 | Bingham | 428/213 |
| 4,552,932 | 11/1985 | Schollenberger | 525/440 |
| 4,653,854 | 3/1987 | Miyata | 359/514 |
| 4,721,649 | 1/1988 | Belisle et al. | 428/325 |
| 4,725,494 | 2/1988 | Belisle et al. | 428/325 |
| 4,763,985 | 8/1988 | Bingham | 350/105 |
| 4,808,471 | 2/1989 | Grunzinger | 428/325 |
| 4,897,136 | 1/1990 | Bailey et al. | 156/145 |
| 4,955,690 | 9/1990 | Bacon, Jr. | 350/105 |
| 4,990,024 | 2/1991 | Eigenmann | 404/12 |
| 5,008,142 | 4/1991 | Wilson et al. | 428/203 |
| 5,064,272 | 11/1991 | Bailey et al. | 359/541 |
| 5,077,117 | 12/1991 | Harper et al. | 428/143 |
| 5,082,715 | 1/1992 | Lasch et al. | 428/143 |
| 5,450,235 | 9/1995 | Smith et al. | 359/529 |
| 5,474,827 | 12/1995 | Crandall et al. | 428/67 |
| 5,536,569 | 7/1996 | Lasch et al. | 428/328 |
| 5,721,311 | 2/1998 | Oien | 524/590 |
| 5,750,191 | 5/1998 | Hachey et al. | 427/163.4 |
| 5,784,198 | 7/1998 | Nagaoka | 359/534 |
| 5,882,771 | 3/1999 | Klein et al. | 428/161 |

FOREIGN PATENT DOCUMENTS

| | | |
|---|---|---|
| 0 082 618 | 5/1986 | European Pat. Off. |
| 0 359 532 B1 | 10/1995 | European Pat. Off. |

*Primary Examiner*—D. S. Nakarani
*Attorney, Agent, or Firm*—Doreen S. L. Gwin

[57] ABSTRACT

Retroreflective sheeting articles 10 that have a retroreflective bead bond layer 15 that contains a polymer that contains linear crystalline segments and that is incorporated into a crosslinked polymeric network.

23 Claims, 1 Drawing Sheet

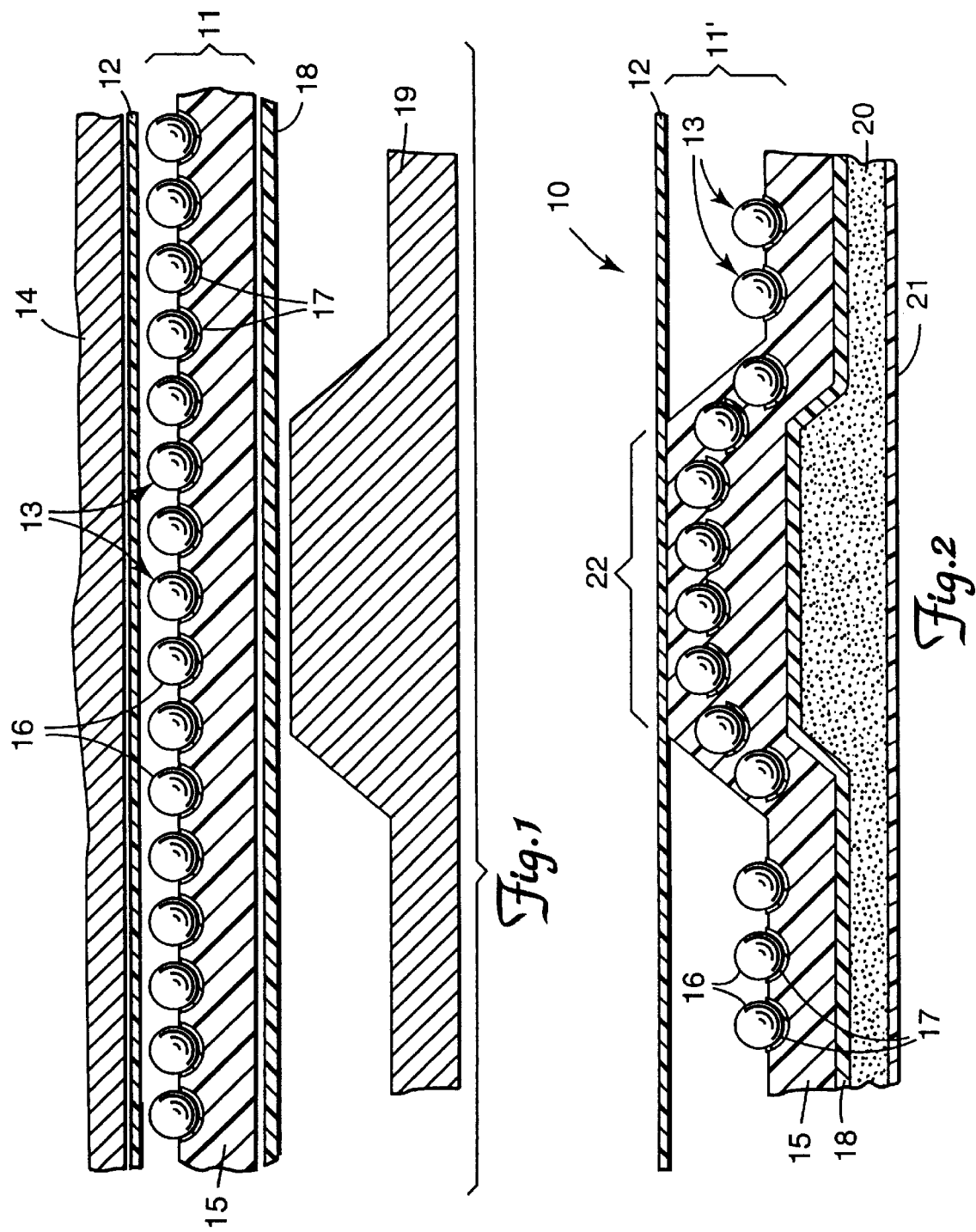

USE OF A CRYSTALLINE BEAD BOND LAYER IN A RETROREFLECTIVE ARTICLE

TECHNICAL FIELD

This invention pertains to a retroreflective article that contains a bead bond layer that has a crystalline polymer incorporated into a crosslinked polymer network.

BACKGROUND

Retroreflective articles are well known and are used in a variety of applications. The articles have the ability to return substantial quantities of incident light—which light would otherwise be reflected elsewhere—back towards the light source. This unique ability has promoted the widespread use of retroreflective articles for a variety of applications, including use on highway signs to display information to motorists at nightime.

In U.S. Pat. No. 3,190,178 McKenzie established a state of the art for retroreflective sheetings by providing cellular retroreflective optical elements in a plurality of hermetically sealed cells. The hermetically sealed cells were formed by heat sealing a bead bond to an acrylic cover film via an emboss roll.

Early bead bond layers were typically composed of a high molecular weight linear thermoplastic acrylate and a pigment. In U.S. Pat. No. 4,025,159, McGrath improved upon the durability of the enclosed lens construction by heat sealing the bead bond to the cover film and bonding the two layers together through curing. Miyata, in U.S. Pat. No. 4,653,854, attached pendent hydroxyl groups to the backbone of the acrylate polymers used for the bead bond. Incorporation of polyisocyanates into the formulation allowed the bead bond to be crosslinked through the formation of urethane linkages.

While these developments helped address issues related to product durability and manufacturing, the processes generally required large amounts of solvent for coating operations. The solvent, of course, must be handled in an environmentally sound manner, and therefore it can cause an increase in processing costs and be an overall drawback in the manufacture of retroreflective sheeting.

Efforts to implement solventless bead bond technology into the construction of cellular retroreflective sheeting generally consisted of dissolving a high molecular weight acrylate polymer in one or more reactive diluents and then coating the material warm. This technique, however, also has certain drawbacks, such as a requirement to chill the product to low temperatures for bead stripping. Belisle et al., in U.S. Pat. No. 4,721,649, reported using a solventless, thermoformable two-component urethane as a polymeric bead bond layer for "embedded-lens" retroreflective sheeting. Bailey et al. (U.S. Pat. Nos. 4,897,136 and 5,064,272) reported using a thermoplastic urethane to develop a solventless bead bond for flexible cellular retroreflective sheeting.

SUMMARY OF THE INVENTION

In spite of the above, the art has fallen short of establishing a bead bond composition that can be produced without volatile solvents, that is a thermoformable solid in the presence of radiation curable monomers at relatively low temperatures, and that affords a material with sufficient green strength to allow retroreflective elements to be removed from a temporary supporting film.

In brief summary, the present invention provides a retroreflective article that contains retroreflective elements supported by a polymeric bead bond layer. The bead bond layer contains a polymer that has linear crystalline polymer segments and that is incorporated into a crosslinked polymeric network. This bead bond layer is thermoformable in the uncured state, has good adhesion to retroreflective elements, and can be prepared without use of a solvent. The invention also provides constructions such as signs and information plates that contain the retroreflective articles of the invention.

"Green strength" refers to the ability of the uncured bead bond layer to adhere to and remove retroreflective beads or elements from the temporary bead carrier on which they are supplied.

All percentages are weight percentages unless otherwise specified.

BRIEF DESCRIPTION OF THE DRAWINGS

FIGS. 1 and 2 are cross-sectional representations of retroreflective sheetings prepared using a bead bond or binder composition in accordance with the present invention.

DETAILED DESCRIPTION OF PREFERRED EMBODIMENTS

The bead bond layers (also referred to in the art as binder layers) of the invention contain linear crystalline polymer segments that are present in a crosslinked polymeric network. The linear crystalline segments may become present in the crosslinked polymeric network by incorporating a polymer that contains those segments into the network. The polymer may become "incorporated" therein by penetrating, e.g., by being physically entangled in the network, by being covalently bonded thereto, or by being ionically bonded thereto. When uncured, the compositions have good green strength and are thermoformable without undue loss of viscosity that would hamper processing.

The polymer that has linear crystalline segments can be essentially any crystalline homopolymer or copolymer that can be disposed in a three-dimensional crosslinked polymeric network. Polymers used in the invention must have a minimum degree of crystallinity. The presence of crystallinity in a sample may be determined using Differential Scanning Calorimetry (DSC) following the thermal analysis method set forth in ASTM D 3418-82, with the exceptions that no preliminary thermal cycle is used, the heating rate during all phases of the procedure is 5° C. per minute, and the thermal cycle is −50° C. to 250° C. The presence of a melt transition peak in the DSC profile indicates the presence of crystallinity.

The crystallinity index (CI) of material possessing some degree of crystallinity can be determined. This index can have a value ranging from 0 for a completely amorphous material to 1 for a completely crystalline material.

To determine the CI of a sample, X-ray diffraction data is collected within a 7 to 37 degree scattering range (2θ). The scattering intensity due to crystalline polymer, amorphous matrix components, and crystalline filler materials is identified. If the diffraction maxima are sufficiently well defined, the CI can be calculated directly as the ratio of scattered intensity due to the crystalline polymer present to the total scattered intensity or peak area above background levels for the crystalline polymer and amorphous matrix components. Peak areas identified as due to filler materials within the scattering range are typically excluded from the calculation. This method of determining the CI may be represented as follows:

$I_{amorph} = \Sigma(\text{amorphous peak areas})$ $I_{cryst} = \Sigma(\text{crystalline peak areas})$ $CI = I_{cyst}/(I_{amorph} + I_{cryst})$ If the peak maxima are not well defined, then it is necessary to identify the scattering intensity above the background that represents the amorphous portion of the material and a scattering intensity above the background representative of the mass of material being examined. A reference sample is required for this method. A reference portion of the material is melted, to ensure that it's completely amorphous. X-ray diffraction data is collected for the reference sample and the experimental sample. For each sample, the level of amorphous material and the amount of material being examined is determined. The ratio of these values for the experimental sample gives the amorphous character of the sample (A). The same ratio is calculated for the amorphous reference ($A_r$), and the ratio of these values can be used as follows to determine the CI of the material:

$CI = 1 - A/A_r$.

The polymers that contain crystalline segments preferably have a crystallinity index of at least about 0.05 and more preferably of about 0.10 to 0.40. The bead bond composition, inclusive of pigments, fillers and the like should have a CI of about 0.05 to 0.30.

Examples of suitable polymers that contain linear crystalline segments include polyesters, polyurethanes, polyolefins, polyacrylates, and polyalkylacrylates. These polymers can be either homopolymers or copolymers and are thermoplastic.

The polymer can be a crystalline, linear polyurethane that contains acrylate functionality, hereinafter referred to simply as a "polyurethane". Useful polyurethanes contain the urethane group —NH—CO—O—, but can contain other groups as desired. The polyurethanes generally have a number average molecular weight of about 2,000 to 100,000, preferably about 2,000 to 30,000, and are the reaction products of a polyol, i.e., a molecule having two or more hydroxy groups, an isocyanate, and optional chain extenders or catalysts.

Polyester polyols are a preferred polyol. The polyester polyols typically have a number average molecular weight of about 200 to 20,000, preferably about 500 to 2,000 and are commercially available or may be synthesized using methods known in the art.

The polyester polyols may be prepared, for example, by polyesterification of aliphatic or aromatic dicarboxylic acids with aliphatic or aromatic glycols. Dicarboxylic acids that may be used include, for example, succinic, fumaric, maleic, adipic, suberic, sebacic, dodecanoic, phthalic and the like, as well as the corresponding anhydrides. These dicarboxylic acids may be reacted with aliphatic or aromatic glycols that contain between 2 and 50 carbon atoms such as ethylene glycol, 3-butene-1,4-diol, 1,4-butanediol, 1,6-hexamethylene glycol, 1,8-octamethylene glycol, 1,10-decamethylene glycol, and so on. Cyclic diols such as 1,4-cyclohexanedimethanol and aromatic polyols such as bis-1,4-(2-hydroxyethoxy) benzene, ethoxylated 2,2-bis(4-hydroxyphenyl) propane and xylene glycol may also be used. Examples of commercially available crystalline polyols that can be used include the Tone® series of polycaprolactones available from Union Carbide, Danbury, Conn., Rucoflex® S-101 poly(ethylene adipate), S-102 poly(butylene adipate), and S-105 poly(hexamethylene adipate), all available from Ruco Polymer Corp., Hicksville, N.Y.; and Dynapol® 7380 poly(dodecamethylene adipate), available from Huls, Inc., Marl, Germany.

Preferred polyols include those of formulas (I) and (II) below:

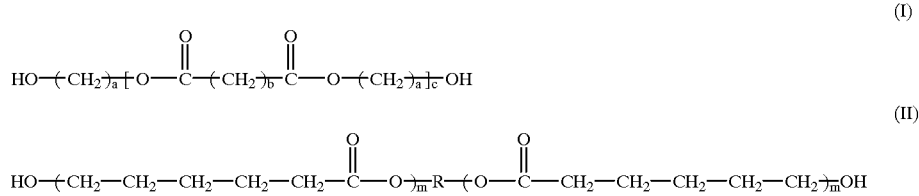

wherein each "a" is independently 2 to 20, "b" is 2 to 50, "c" is 1 to 100, each "m" is independently 1 to 50, and R is an alkylene group of 2 to 22 carbon atoms that may be straight-chain or branched.

The polyol is reacted with one or more isocyanates, preferably diisocyanates, to form the crystalline polyurethane. While aliphatic, alicyclic, and aromatic diisocyanates may be used, aliphatic diisocyanates are generally preferred. Examples of useful aliphatic diisocyanates include hexamethylene diisocyanate, methylene-bis(4-cyclohexyl isocyanate), isophorone diisocyanate, and so on. Useful aromatic diisocyanates include naphthalene-1,5-diisocyanate, tolulene diisocyanate, the phenylene diisocyanates, diphenyl methane diisocyanates, and so on. Multi-functional isocyanates and/or polyols can also be used in amounts that will not interfere with subsequent thermoforming operations. Generally, the reaction mixture can contain about 1 to 10 weight percent of such multi-functional components. Mixtures and derivatives of these compounds can also be used.

The polyurethane may contain unsaturation, allowing it to be incorporated into the three-dimensional acrylate network. This functionality may be pendent or terminal to the polymer backbone, or it may be incorporated into the polymeric backbone. The unsaturation is generally incorporated into the crystalline polyurethane in the form of an ethylenically unsaturated compound that may be reacted with the preformed crystalline polyurethane or included in the polyol/isocyanate reaction mixture.

The ethylenically unsaturated compound can be a nucleophile such as an ethylenically unsaturated alcohol, amine, thiol, epoxide, amide, carbamates, or carboxylic acid. Vinyl alcohols and hydroxy acrylates or hydroxy alkyl acrylates such as methacrylate are examples of useful ethylenically unsaturated nucleophiles.

Preferred ethylenically unsaturated nucleophiles include 2-hydroxyethyl acrylate, 2-hydroxybutyl acrylate, 2-hydroxyethyl methacrylate, 2-hydroxypropyl acrylate, 2-hydroxypropyl methacrylate, 2-hydroxyethyl ethacrylate, 3-butene-1,4-diol, diethylene glycol monoacrylate, diethylene glycol monomethacrylate, glycerol methacrylate, caprolactone acrylate, and the like.

If desired, the ethylenically unsaturated compound can be an electrophile such as an ethylenically unsaturated carboxylic acid or a carboxylic acid derivative, including acid halides, esters, amides and the like and isocyanates.

Specific examples of useful ethylenically unsaturated electrophiles include acryloyl chloride and 3-isopropenyl-α,α-dimethylbenzeneisocyanate.

The polyurethanes may be prepared by pre-reacting the polyol and isocyanate components to form an NCO-endcapped polyurethane, and then reacting this NCO-endcapped polyurethane with the ethylenically unsaturated nucleophile. The molar ratio of isocyanate to hydroxy groups is about 3:1 to 1:1. When this two-step method is used, the NCO-endcapped polyurethane is reacted with the acrylate functional nucleophile in a molar ratio of about 1:2 to 1:2.5, optionally in the presence of an appropriate organic solvent.

The polyurethanes may also be prepared by combining the polyol, isocyanate, and ethylenically unsaturated nucleophile together in a single reaction mixture. In this method, the components are combined in a reaction vessel and stirred at a temperature of about 70° to 120° C. for about 3 to 24 hours under an inert atmosphere such as nitrogen. After polymerization is complete, the polyurethane is drained into a heat sink to form ribbons of polymer that can be pelletized. Reactive extrusion can also be performed.

A catalyst can be employed in the reaction. Catalysts for the reaction of polyisocyanates and active hydrogen-containing compounds are well-known in the art; see, for example, U.S. Pat. No. 4,495,061. Preferred catalysts include organometallic compounds and amines. The organometallic compounds may be organotin compounds such as dimethyltin dilaurate, dibutyltin dilaurate, dibutyltin dimercaptide, dimethyltin dithioglycolate, and dioctyltin dithioglycolate. The amine catalysts preferably are tertiary amines such as triethylene diamine, dimorpholinodiethyl ether, and tris(dimethylamino ethyl)phenol. Generally, the catalyst is present in the reaction mixture at 0.02 to 0.30 percent, preferably 0.06 to 0.20 percent, and more preferably 0.07 to 0.15 percent.

Polymers other than the polyurethanes described above also may be used in preparing the bead bond compositions useful in the invention so long as they possess the required degree of crystallinity. Examples of such polymers include crystalline polyesters such as the Dynapol® series available from Huls, Inc., Marl, Germany, polycaprolactones such as the Tone® series available from Union Carbide, low density polyethylene (LDPE), linear low density polyethylene (LLDPE), poly(decamethylene adipate), poly(decamethylene sebacate), poly(decamethylene succinate), poly(decamethylene glutarate), poly(decamethylene pimelate), poly(decamethylene suberate), poly(decamethylene azelate), poly(nonamethylene azelate), poly(hexamethylene adipate), poly(hexamethylene sebacate), poly(ethylene adipate), poly(propylene succinate), poly(heptamethylene succinate), poly(septamethylene succinate), poly(octamethylene succinate), poly(nonamethylene succinate). Copolymers of the above mentioned polyesters can also be used.

The polymer that contains linear crystalline segments can be combined with one or more monomers that are radiation or thermally sensitive. Useful radiation sensitive monomers include those containing acrylate, alkylacrylate, vinyl, ethynyl, vinyl ether, epoxy, or ethylene functionality. Thermally sensitive materials that can be used include isocyanates, melamines, silanes and the like. When uncured, the composition possesses good green strength and is thermoformable. The mixture cures on exposure to radiation and/or heat, whereby the crystalline segments of the polymer become incorporated into the crosslinked polymeric network that is formed from the monomers.

Of the radiation sensitive monomers described above, acrylates and methacrylates are preferred. Classes of acrylates that can be used include acrylated epoxy resins, acrylated epoxidized soya and linseed oils, aromatic urethane acrylates, aliphatic urethane acrylates, polyester acrylates, silicone acrylates, acrylated acrylates, acrylated polybutadiene, acrylated melamines, and other mono- and poly-functional acrylates.

Particular examples of useful acrylates include 2-ethylhexyl acrylate, octadecyl acrylate, isodecyl acrylate, lauryl acrylate, stearyl acrylate, biphenyl acrylate, tridecyl methacrylate, 2-phenoxyethyl acrylate, ethoxylated phenoxyethyl acrylate, nonyl phenol ethoxylate monoacrylate, β-carboxyethyl acrylate, isobornyl acrylate, tetrahydrofurfuryl acrylate, tetrahydrofurfuryl methacrylate, 4-(butylcyclohexyl) acrylate, dicyclopentenyl acrylate, dicyclopentenyl oxyethyl acrylate, propylene glycol monoacrylate, propylene glycol monomethacrylate, 2-(2-ethoxyethoxy) ethyl acrylate, hydroxy ethyl acrylate, hydroxy propyl acrylate, hydroxy ethyl methacrylate, hydroxy propyl methacrylate, n-vinyl pyrrolidone, cyclohexyl acrylate, ethoxylated monoacrylate, monofunctional aromatic acrylate, ethoxylated aromatic acrylate, monofunctional aliphatic urethane acrylates, butanediol diacrylate, 1,3-butylene glycol dimethacrylate, hexanediol diacrylate, hexanediol dimethacrylate, neopentyl glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, dipropylene glycol diacrylate, tripropylene glycol diacrylate, ethoxylated neopentyl glycol diacrylate, propoxylated neopentyl glycol diacrylate, dianol diacrylate, dianol dimethacrylate, tetrabromo dianol diacrylate, trimethylolpropane triacrylate, pentaerythritol triacrylate, trimethylolpropane trimethacrylate, ethoxylated trimethylolpropane triacrylate, propoxylated trimethylolpropane triacrylate, glycerol propoxylated triacrylate, propoxylated glycerol triacrylate, tris (2-hydroxyethyl) isocyanurate triacrylate, pentaerythritol tetraacrylate, dipentaerythritol pentaacrylate, dimethylolpropane tetraacrylate, alkoxylated tetraacrylate, highly alkoxylated tetraacrylates, trimethylolpropane diallyl ether, pentaerythritol triallyl ether, trimethylolpropane diallyl ether acrylate.

Preferred acrylates include tetraethylene glycol diacrylate, polyethylene glycol diacrylate, tripropylene glycol diacrylate, trimethylolpropane triacrylate, pentaerythritol triacrylate, tris(2-hydroxyethyl) isocyanurate triacrylate, pentaerythritol tetraacrylate, dipentaerythritol pentaacrylate and dimethylolpropane tetraacrylate.

Other components can be added to the bead bond composition as desired or necessary. Examples of such additional components include pigments, dyes, antioxidants, hindered amine light stabilizers, ultraviolet light absorbers, flow control agents, plasticizers, elastomers, and other polymeric modifiers.

The bead bond composition used in the articles of the invention is prepared by combining the polyurethane, the acrylate(s) monomers, and any other components at a temperature of about 60° to 170° C. The exact temperature and mixing time depends on the properties of the particular components used. The composition can also be prepared in a reactive extruder and extruded directly onto the bead carrier.

The polyurethane is present in the bead bond composition at about 30 to 90 percent, and the radiation or heat sensitive component is present at about 5 to 60 percent. A pigment is often included in the composition and may make up about 10 to 30 percent of the composition.

The compositions are useful as a bead bond or binder layer in the preparation of retroreflective sheetings, particularly encapsulate-lens type retroreflective sheeting. Such sheeting is known in the art and is discussed, for example, in McKenzie, U.S. Pat. No. 3,190,178 and Bailey et al., U.S. Pat. No. 5,064,272.

The binder layer typically is a continuous, sheet-like layer that has a thickness of about 25 to 500 microns. Preferably, the thickness is about 75 to 125 microns. Thicknesses less than 25 microns may be too thin to adhere to both the substrate and the optical elements, and thicknesses greater than 500 microns may be too stiff and will generally be expensive.

As indicated above, optical elements are employed to alter the direction of light. The optical elements can be microspheres that, preferably, are substantially spherical in shape to provide uniform and efficient retroreflection. The microspheres preferably also are substantially transparent so as to minimize light absorption so that a large percentage of incident light is retroreflected. The term "transparent" is used herein to mean capable of transmitting light. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins. Examples of microspheres that may be useful in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,93 1,414.

The microspheres typically have an average diameter of about 10 to 200 microns, preferably about 25 to 80 microns. Microspheres used in the present invention typically have a refractive index of about 1.91, although values of about 1.5 to 2.5 may be useful as well, depending on the type of sheeting desired.

As mentioned above, optical elements used in this invention can have a metal reflective layer disposed beneath the embedded portions of the optical elements to provide a multitude of retroreflective elements. Preferably, the metal reflective layer is disposed on the embedded or rear portions of the optical elements. The term "metal reflective layer" is used herein to mean a layer comprising elemental metal which is capable of reflecting light, preferably specularly reflecting light. The metal may be a continuous coating produced by vacuum-deposition, vapor coating, chemical-deposition, or electroless plating. A variety of metals may be used to provide a specularly reflective metal layer. These include aluminum, silver, chromium, nickel, magnesium, and the like, in elemental form. Aluminum and silver are preferred metals for use in the reflective layer. It is to be understood that in the case of aluminum, some of the metal may be in the form of the metal oxide and/or hydroxide. Aluminum and silver metals are preferred because they tend to provide good retroreflective brightness. The metal layer should be thick enough to reflect incoming light. Typically, the metal reflective layer is about 50 to 150 nanometers thick. Although the reflective color of a silver coating can be brighter than an aluminum coating, an aluminum layer normally is preferred.

In lieu of or in addition to a metal reflective layer, a dielectric mirror may be used as a specularly reflective layer. The dielectric mirror may be similar to known dielectric mirrors disclosed in U.S. Pat. Nos. 3,700,305 and 4,763,985 to Bingham.

A cover film can be employed to protect the sheeting material. This film is typically transparent and is made of a durable polymeric material, such as polycarbonate, polymethyl methacrylate, and the like.

An especially useful transparent cover film comprises polymethylmethacrylate, which maintains its clarity and other properties very well under outdoor weathering conditions. Polycarbonate films are also useful, and especially where outdoor durability is not important, films such as cellulose acetate, and cellulose acetate butyrate may be used. The cover films are typically between about 25 to 125 microns (1 and 5 mils) thick, though they may have other thicknesses also. In addition to thermoplastic cover films as described, cover films may be used that react both internally and with the material that it is being bonded to.

In general, the retroreflective sheeting can be prepared by partially embedding a monolayer of lenses such as glass microspheres into a temporary carrier web to a depth not exceeding 50 percent of the diameter of each microsphere; depositing specularly reflecting material over the lens-bearing surface of the carrier web; extruding the bead bond composition of the invention over the specularly reflecting deposit; stripping away the carrier web; applying heat and pressure to the bead bond layer to cause the bead bond composition to flow to form hermetically sealed cells between the transparent cover film and the bead binder; and curing the composition. Cure may take place by exposure to actinic radiation, preferably e-beam radiation, or by exposure to thermal energy. Thermal cures can take place at temperatures of about 0 to 100° C.

Preparation of a retroreflective sheeting that employs the composition of the invention is illustrated in FIG. 1. The sheeting is prepared from a cover film 12, a layer of retroreflective elements 13 (that include microspheres 16, and an underlying reflective layer 17), and a bead bond layer 15. A liner 18 underlies the bead bond layer 15. The cover film 12 and the reflecting structure 11 are laminated together to form the sheeting. A die element 19 contacts the thermoformable layer beneath the microspheres and presses the laminate against a smooth surface 14. Sufficient heat is applied to cause the bead bond layer 15 to flow towards the cover film 12.

A retroreflective sheeting 10 that incorporates the binder composition of the invention is illustrated in FIG. 2. The structure includes a transparent cover film 12, a layer of retroreflective elements that include microspheres 16 having a reflective material 17 beneath them, a binder layer 15, and liner 18. In area 22 a hermetic seal has been formed as a result of the binder material 15 flowing through the layer of microspheres and into contact with the cover film 12 as a result of the lamination process described above. These seals separate the face of the sheeting into sealed, reflective pockets, 11'. The seal lines can form any desired pattern, such as a grid or other geometric shapes. One preferred pattern is hexagonal. The sheeting may optionally further include an adhesive layer 20 and a release liner 21. When these layers 20 and 21 are present, the use of a liner 18 is optional.

The invention may be further understood by reference to the following examples, which are merely illustrative and not limiting of the invention.

EXAMPLES

Glossary of Materials

The following materials are used in the following examples:

RUCOFLEX S-105-55 poly(hexamethylene adipate) from Ruco Polymer Corporation;

RUCOFLEX S-105-30 poly(hexamethylene adipate) from Ruco Polymer Corporation;

DESMODUR W diisocyanate from Bayer Corporation, Pittsburgh, Pa.;

DESMODUR N3300 polyisocyanate from Bayer Corporation;

TINUVIN 292 hindered amine light stabilizer from Ciba-Geigy Corporation, Hawthorne, N.Y.;

TINUVIN 328 ultraviolet light absorber from Ciba-Geigy Corporation;

TINUVIN 770 hindered amine light absorber from Ciba-Geigy Corporation;

CGI 1700 photoinitator from Ciba-Geigy Corporation;

IRGANOX 1010 antioxidant from Ciba-Geigy Corporation;

TONE 260 polycaprolactone from Union Carbide Corporation, Danbury, Conn.;

TONE P-767E polycaprolactone from Union Carbide Corporation;

DYNAPOL 7380 poly(dodecamethylene adipate), Huls, Inc.;

DYNAPOL S1402 polyester, Huls, Inc.;

SARTOMER SR368 from Sartomer Co., Exeter, Pa.;

ACRYLOID B-66 polyacrylate from Rohm & Haas Co., Philadelphia, Pa.;

Example 1

An acrylate functional polyester polyurethane was synthesized by combining 2000.0 g (1.9 equiv.) of RUCOFLEX S-105-55, 264.6 g (2.0 equiv.) of DESMODUR W, 34.4 g (0.1 equiv.) of caprolactone acrylate, 2.3 g of TINUVIN 292 and 16 drops (16 G needle) of stannous octoate in a 5 L flask and heating at 85–95° C. for 6.5 hours. The polymer was poured onto a polyethylene terephthalate (PET) liner in thin ribbons and allowed to cool.

Example 2

An acrylate functional polyester polyurethane was synthesized by combining 3609.8 g (1.9 moles) of RUCOFLEX S-105-30, 267.6 g (2.0 moles) of DESMODUR W, 33.4 g (9.7×10$^{-2}$ moles) of caprolactone acrylate, 3.9 g of TINUVIN 292 and 28 drops (16 G needle) of stannous octoate in a 5 L flask and heating at 85–90° C. for 8 hours. The polymer was poured onto a PET liner in thin ribbons and allowed to cool.

Example 2A

An acrylate functional polyester polyurethane was synthesized by combining 1410.63 g (0.75 moles) of RUCOFLEX S-105-30, 126.94 g (0.97 moles) of DESMODUR W, 7.60 g of TINUVIN 292 and 18 drops (16 G needle) of stannous octoate in a 3 L flask and heating at 110° C. for 4 hours. The polymer melt was then treated with 86.17 g (0.25 mole) of caprolactone acrylate and heated at 110° C. for 3 hours. The polymer was poured onto a PET liner in thin ribbons and allowed to cool. The polymer possessed a crystallinity index value of 0.30.

Example 3

An acrylate functional polyester polyurethane was synthesized by combining 871.6 g (0.57 equiv.) of TONE 260, 79.9 g (0.60 equiv.) of DESMODUR W, 10.3 g (0.03 equiv.) of caprolactone acrylate, 0.96 g of TINUVIN 292 and 10 drops (16 G needle) of stannous octoate in a 3 L flask and heating at 95° C. for 6 hours. The polymer was poured onto a PET liner in thin ribbons and allowed to cool.

Example 4

An acrylate functional polyester polyurethane was synthesized by combining 1364.7 g (0.73 equiv.) of DYNACOL 7380, 101.4 g (0.77 equiv.) of DESMODUR W, 13.1 g (0.04 equiv.) of caprolactone acrylate, 1.5 g of TINUVIN 292 and 15 drops (16 G needle) of stannous octoate in a 3 L flask and heating at 90–95° C. for 7 hours. The polymer was poured onto a PET liner in thin ribbons and allowed to cool.

Example 5

A crystalline bead bond composition was prepared by adding 167.5 g of the polyurethane of Example 2, 37.5 g of tetraethylene glycol diacrylate, 45.0 g of TiO$_2$ and 2.5 g of TINUVIN 770 to a high shear Brabender® mixing head, preheated to 72° C. Once a homogenous mixture was obtained, the contents were allowed to mix for 10 minutes at 80–115° C. and then removed from the mixing head and allowed to cool.

Example 6

A crystalline bead bond composition was prepared by adding 145.6 g of the polyurethane of Example 2A, 39.0 g of dipentaerythritol pentaacrylate, 26.0 g of tetraethylene glycol diacrylate, 46.8 g of TiO$_2$ and 2.6 g of TINUVIN 328 to a high shear Brabender® mixing head, preheated to 72° C. Once a homogeneous mixture was obtained, the contents were allowed to mix for 10 minutes at 80–115° C. and then removed from the mixing head and allowed to cool. The crystalline bead bond composition possessed a crystallinity index of 0.20.

Example 7

A crystalline bead bond composition was prepared by adding 192.4 g of an acrylate functional polyester urethane resin that is the reaction product of RUCOFLEX S-105-30 and DESMODUR-W endcapped with caprolactone acrylate, 39.0 g of SARTOMER SR368, 26.0 g of tetraethylene glycol diacrylate, 2.6 g of TiO$_2$ and 2.6 g of CGI 1700 to a high shear Brabender® mixing head, preheated to 72° C. Once a homogenous mixture was obtained, the contents were allowed to mix for 10 minutes at 80–115° C. and then removed from the mixing head and allowed to cool.

Example 8

A crystalline bead bond composition was prepared by adding 145.6 g of the acrylate functional polyester urethane resin used in Example 7, 39.0 g of SARTOMER SR368, 26.0 g of tetraethylene glycol diacrylate, 46.8 g of TiO$_2$ and 2.6 g of IRGANOX 1010 to a high shear Brabender® mixing head, preheated to 72° C. Once a homogenous mixture was obtained, the contents were allowed to mix for 10 minutes at 80–115° C. and then removed from the mixing head and allowed to cool. The crystalline bead bond composition possessed a crystallinity index of 0.18.

Example 9

A crystalline bead bond composition was prepared by adding 155.0 of the polyurethane of Example 2, 50.0 g of tripropylene glycol diacrylate, 45.0 g of $TiO_2$ and 2.5 g of TINUVIN 770 to a high shear Brabender® mixing head, preheated to 72° C. Once a homogenous mixture was obtained, the contents were allowed to mix for 10 minutes at 80–115° C. and then removed from the mixing head and allowed to cool.

Example 10

A crystalline bead bond composition was prepared by adding 180.0 g of the polyurethane of Example 1, 25.0 g of tetraethylene glycol diacrylate, 45.0 g of $TiO_2$ and 2.5 g of TINUVIN 770 to a high shear Brabender® mixing head, preheated to 72° C. Once a homogenous mixture was obtained, the contents were allowed to mix for 10 minutes at 80–115° C. and then removed from the mixing head and allowed to cool.

Example 11

A crystalline bead bond composition was prepared by adding 21.44 g of DYNAPOL S1402, 4.80 g of tetraethylene glycol diacrylate, 5.76 g of $TiO_2$ and 0.32 g of TINUVIN 770 to a high shear Brabender® mixing bowl, preheated to 120° C. Once a homogeneous mixture was obtained, the contents were allowed to mix for 10 minutes at 120° C. (150 revolutions per minute (rpms)), cooled to 90° C. and removed from the mixing head.

Example 12

A crystalline bead bond composition was prepared by adding 10.9 g of TONE P-767E, 6.0 g of ACRYLOID B-66, 5.0 g of TiO2, 0.30 g of TINUVIN 770 and 3.0 g of DESMODUR N3300 to a high shear Brabender® mixing head, preheated to 80° C. Once a homogeneous mixture was obtained, the contents were allowed to mix for 10 minutes at 80–100° C., and were removed from the mixing head and cooled to room temperature.

Retroreflectivity and Crystallinity Measurements

Retroreflectivity measurements for each of the following sheeting materials were obtained using a retroluminometer on 5 cm by 7 cm samples. The samples were adhered to an Al panel using a pressure sensitive adhesive and mounted in the plane of the first and second axes. The samples were illuminated at an entrance angle of −4° and retroreflectance measurements were collected at a 0.2° observation angle. The geometrical coordinates as defined in ASTM E808-81 were used to define axes and angles. The samples were oriented in the plane of the sample to achieve maximum reflectance. The data is reported in candelas per lux per square metre ($cd/lx/m^2$).

Crystallinity measurements were made on free standing polymer webs supported by an aluminum specimen holder in which an aperture was milled so that the holder did not contribute to the observed pattern. X-ray diffraction data were collected in a reflection geometry using a Philips vertical goniometer equipped with variable entrance slits, graphite diffracted beam monochromator, and sealed proportional counter. The incident radiation used was copper $K_\alpha$ with generator settings of 45 kV and 35 mA. Step scans of each film were conducted within the 5 to 55 degree (2θ) scattering angle range employing a stop size of 0.04 degrees and 4 second count time.

From the observed data, scattered intensity due to crystalline polymer, amorphous matrix components, and crystalline filler materials are identified. Crystallinity indices are calculated using one of two basic methods. Data obtained from polymeric materials that produce sufficiently defined diffraction maxima are subjected to peak profile analysis to evaluate scattered intensity for amorphous and crystalline components. Data obtained from materials that possess poorly defined maxima use measurement of characteristic intensity values for the amorphous and crystalline components.

For this work, data were subjected to profile fitting using the appropriate peak shape for the observed data within the 7 to 37 degree (2θ) scattering range. For these materials, Gaussian peak shapes were sufficient to properly define the observed peaks and instrumental background level was accounted for by a linear relationship. Crystallinity indices are calculated as the ratio of scattered intensity due to the crystalline polymer present, to the total scattered intensity or peak area above background for crystalline polymer and amorphous matrix components. Peak area identified as being due to filler materials within the 7 to 37 degree (2θ) range are normally excluded from the calculation.

Example 13

Retroreflective sheeting was prepared by pressing thin films of the composition of Example 5 into thin films (100 to 150 microns; 4–6 mils) at 70–90° C., heat laminating the pressed thin films between bead carrier and 25 micron (1 mil) PET at 70° C. (3 meters/minute; 0.7 $kg/cm^2$; 10 psi) using nip rolls, transferring the metallized optical elements from the bead carrier to the crystalline bead bond by running the sheeting over a sharp edge, laminating and embossing an acrylate top film to the bead bond at 90° C. (3 to 6 meters/minute; 2.8 $kg/cm^2$, 40 psi), and then curing the coating with e-beam radiation (200 kilo electronvolts (KeV), 15.3 meters/minute, 3.0 megarads (Mrad)). The final construction exhibited a retroreflectance value of 325 $cd/lx/m^2$.

Example 14

Retroreflective sheeting was prepared by pressing thin 100 to 150 micron thick (4–6 mils) films of a bead bond of Example 6 between bead carrier and a 25 micron (1 mil) thick PET film at 70° C. using a platen press, transferring the metallized optical elements from the bead carrier to the crystalline bead bond by running the sheeting over a sharp edge and then curing the coating with e-beam radiation (200 KeV, 15.3 meters/minute, 3.0 Mrad). The final construction exhibited a retroreflectance value of 417 $cd/lx/m^2$ and had a crystallinity index of 0.19.

Example 15

Retroreflective sheeting was prepared by pressing thin 100 to 150 micron (4–6 mils) thick films of a bead bond of Example 7 between bead carrier and a 25 micron (1 mil) thick PET at 70° C. using a platen press, transferring the metallized optical elements from the bead carrier to the crystalline bead bond by running the sheeting over a sharp edge and then curing the coating with UV radiation (10 min with 40 W Sylvania 360 Blacklights). The final construction exhibited a retroreflectance value of 450 cd/lx/m² and had a crystallinity index of 0.23.

Example 16

Retroreflective sheeting was prepared by pressing thin 100 to 150 micron (4–6 mils) thick films of a bead bond of Example 8 between a bead carrier and a 25 micron thick PET at 70° C. using a platen press, transferring the metallized optical elements from the bead carrier to the crystalline bead bond by running the sheeting over a sharp edge and then curing the coating with e-beam radiation (200 KeV; 15.3 meters/minute; 3.0 Mrad). The final construction exhibited a retroreflectance value of 458 cd/lx/m² and had a crystallinity index of 0.23.

Example 17

Retroreflective sheeting was prepared by pressing 100 to 150 micron (4–6 mil) thick films having the composition of Example 10 at 70–90° C. using a platen press, heat laminating the pressed films between bead carrier and 25 micron thick PET at 70° C. (305 cm/minute, 0.7 kg/cm² (10 psi)), transferring the metallized optical elements from the bead carrier to the crystalline bead bond by running the sheeting over a sharp edge, laminating and embossing a polymethyl methacrylate top film to the bead bond at 90° C. (3 to 6 meters/minute, 2.8 kg/cm² (40 psi)), and then curing the coating with e-beam radiation (200 KeV, 15.3 meters/minute, 3.0 Mrad). The final construction exhibited a retroreflectance value of 290 cd/lx/m².

Example 18

Retroreflective sheeting was prepared by pressing thin films of the composition of Example 12 at 138° C. (844 Kg/cm²; 12,000 psi) to form thin sheets, heat laminating the thin sheets between a bead carrier and a 25 micron thick PET film at 121° C. (70–350 Kg/cm²; 1000–5000 psi) for 5 seconds, transferring the metallized optical elements from the bead carrier to the crystalline bead bond by running the laminate over a sharp edge, laminating an acrylate top film to the bead bond, and embossing at 149° C (4.2 Kg/cm² (60 psi), 366 cm per minute). The final construction was cured over a period of 7 days at 23° C. and exhibited a retroreflectance value of 280 cd/lx/m².

All of the patents and patent applications cited above are wholly incorporated by reference into this document.

We claim:

1. Retroreflective sheeting comprising retroreflective microspheres supported by a bead bond layer that includes a polymer that has linear crystalline segments, the polymer being incorporated into a crosslinked polymeric network.

2. The sheeting of claim 1, wherein the bead bond layer has a crystallinity index of about at least 0.05.

3. The sheeting of claim 1, wherein the bead bond layer has a crystallinity index of about 0.10 to 0.40.

4. The sheeting of claim 1, wherein the bead bond layer has a crystallinity index of about 0.05 to 0.30.

5. The sheeting of claim 1, wherein the polymer is the reaction product of a polyester polyol and isophorone diisocyanate, hexamethylene diisocyanate, 1,1-bis(4-isocyanatocyclohexyl), or a mixture thereof.

6. The sheeting of claim 1, wherein the bead bond layer is cured by exposure to actinic radiation.

7. The sheeting of claim 1, further comprising a polymeric cover film.

8. The sheeting of claim 7, wherein the polymeric cover film comprises polymethylmethacrylate.

9. The sheeting of claim 1, wherein the polymer is the reaction product of an isocyanate and a crystalline polyester polyol of formula (I) and/or (II)

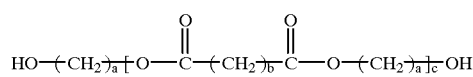

(I)

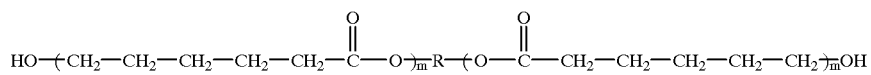

(II)

wherein each "a" is independently 2 to 20, "b" is 2 to 50, "c" is 1 to 100, each "m" is independently 1 to 50, and R is an alkylene group of 2 to 22 carbon atoms that is straight-chain or branched-chain.

10. The sheeting of claim 1, wherein the polymer is thermoformable in the uncured state, and has sufficient green strength and adhesion to the microspheres before thermoforming to enable transfer of the microspheres from a bead carrier web to the bead bond polymer layer.

11. The sheeting of claim 1, wherein the polymer can be prepared and coated without use of a solvent.

12. The sheeting of claim 1, wherein the layer is covalently crosslinked.

13. The sheeting of claim 1, wherein the layer is ionically crosslinked.

14. The sheeting of claim 1, wherein the microspheres have a specularly reflecting layer disposed on the microspheres.

15. A retroreflective article comprising retroreflective elements supported by a bead bond layer that includes a polymer that has linear crystalline segments, the polymer being incorporated into a crosslinked polymeric network, wherein the bead bond contains a crystalline polyester urethane polymer that is incorporated into a crosslinked acrylate network.

16. The article of claim 15, wherein the crosslinked acrylate network is prepared from an acrylated epoxy resin, a polyester acrylate, a urethane acrylate, a silicone acrylate, an acrylated acrylate, an allyl acrylate, an aliphatic mono- or poly-acrylate, or a mixture thereof.

17. The article of claim 15, wherein the crosslinked acrylate network is prepared from a polyethylene glycol diacrylate, dimethylol propane tetraacrylate, trimethylol propane triacrylate, tris-(2-hydroxyethyl) isocyanurate triacrylate, tetraethylene glycol diacrylate, tripropylene glycol diacrylate, pentaerythritol tetraacrylate, dipentaerythritol pentaacrylate, or a mixture thereof.

18. A retroreflective article comprising retroreflective elements supported by a bead bond layer that includes a polymer that has linear crystalline segments, the polymer being incorporated into a crosslinked polymeric network, wherein the bead bond layer comprises a polymer layer formed from:

(a) 30 to 90 wt-% crystalline polyester polyurethane having terminal acrylate functionality; and (b) 10 to 60 wt-% multifunctional acrylate monomer; and contains (c) 10 to 20 wt-% pigment.

19. A retroreflective article comprising retroreflective elements supported by a bead bond layer that includes a polymer that has linear crystalline segments, the polymer being incorporated into a crosslinked polymeric network, wherein the bead bond layer comprises a polymer layer formed from:

(a) 30 to 90 wt-% crystalline polyester polyurethane having pendent acrylate functionality; and (b) 10 to 60 wt-% multifunctional acrylate monomer; and contains (c) 10 to 20 wt-% pigment.

20. A retroreflective article comprising retroreflective elements supported by a bead bond layer that includes a polymer that has linear crystalline segments, the polymer being incorporated into a crosslinked polymeric network, wherein the bead bond layer comprises a polymer layer formed from:

(a) 30 to 90 wt-% crystalline polyester polyurethane having terminal unsaturation; and (b) 10 to 60 wt-% multifunctional acrylate monomer; and contains (c) 10 to 20 wt-% pigment.

21. A retroreflective article comprising retroreflective elements supported by a bead bond layer that includes a polymer that has linear crystalline segments, the polymer being incorporated into a crosslinked polymeric network, wherein the bead bond layer comprises a polymer layer formed from:

(a) 30 to 90 wt-% crystalline polyester polyurethane having internal and/or pendent unsaturation; and (b) 10 to 60 wt-% multifunctional acrylate monomer; and contains (c) 10 to 20 wt-% pigment.

22. Retroreflective sheeting that comprises retroreflective microspheres supported by a bead bond layer that was cured by exposure to radiation to form a polymer that contains linear crystalline segments incorporated into a crosslinked polymeric network.

23. The article of claim 22, wherein the polymer that contains linear crystalline segments is incorporated into the crosslinked polymeric network by placing it in a mixture that includes monomers that form the crosslinked polymeric network.

* * * * *

UNITED STATES PATENT AND TRADEMARK OFFICE
CERTIFICATE OF CORRECTION

PATENT NO. : 6,156,436
DATED : December 5, 2000
INVENTOR(S) : William D. Joseph, Lee A. Pavelka and Raymond E. Grunzinger Page 1 of 1

It is certified that error appears in the above-identified patent and that said Letters Patent is hereby corrected as shown below:

Column 7,
Line 42, "4,93 1,414." should read -- 4,913,414. --.

Column 10,
Line 30, "Brabender$^R$ " should read -- Brabender $^{TM}$ --.
Line 42, "Brabender$^R$ " should read -- Brabender $^{TM}$ --.
Line 57, "Brabender$^R$ " should read -- Brabender $^{TM}$ --.
Line 67, "Brabender$^R$ " should read -- Brabender $^{TM}$ --.

Column 11,
Line 11, "Brabender$^R$ " should read -- Brabender $^{TM}$ --.
Line 22, "Brabender$^R$ " should read -- Brabender $^{TM}$ --.
Line 32, "Brabender$^R$ " should read -- Brabender $^{TM}$ --.
Line 42, "Brabender$^R$ " should read -- Brabender $^{TM}$ --.

Signed and Sealed this

Twelfth Day of February, 2002

*Attest:*

JAMES E. ROGAN
*Attesting Officer*     *Director of the United States Patent and Trademark Office*